United States Patent Office 2,962,468
Patented Nov. 29, 1960

2,962,468
ADHESIVE COMPOSITION

James H. Groves, Lombard, Ill., assignor to American Can Company, New York, N.Y., a corporation of New Jersey No Drawing. Filed June 28, 1955, Ser. No. 518,671

6 Claims. (Cl. 260—42)

The present invention relates to an adhesive composition comprising a polyamide resin. More particularly it relates to a high strength, quick setting adhesive composition comprising the reaction product of a linear polyamide and an epoxy resin.

Because of their high chemical inertness and high tensile strength, linear polyamide resins are very desirable as organic adhesives for the cementing of various surfaces together, principally metals. However, a deficiency common to all of these polyamides is their poor adhesion to most if not all metal surfaces. Applicant has succeeded in overcoming such deficiency after considerable experimental work.

It is therefore an object of the present invention to provide a novel adhesive composition comprising a linear polyamide.

Another object is to provide a polyamide adhesive composition having high strength in adhesion as well as cohesion.

A further object is to provide a polyamide adhesive composition which may be used to effect high strength bonds in a very short interval of time.

An additional object is the provision of a polyamide adhesive composition which adheres to a great variety of surfaces.

Still another object is to provide a polyamide adhesive composition which is an effective substitute for solder as a bonding agent in the side seam of a sheet metal container and has substantially the same or greater bond strength as metallic solder.

Numerous other objects and advantages of the invention will be apparent as it is better understood from the following description which is of a preferred embodiment thereof.

Applicant has discovered that the stated objects can be obtained by combining with a linear polyamide an epoxy resin as an adhesion promotor for the polyamide. When this composition of linear polyamide and epoxy resin is heated in contact with the surfaces to be joined, to a temperature above the melting point of the polyamide, and held at this temperature for a brief interval of time and thereafter cooled, upon setting and hardening of the cement or adhesive there results between the surfaces a high strength bond comparable to or greater than that of metallic solder. Unexpectedly applicant found that this increased adhesion of the linear polyamide to the substrate is not restricted to any one single material or metal but that the combination of the epoxy resin with the linear polyamide increased the adhesion of the polyamide to a great variety of metallic and non-metallic surfaces.

The polyamide resins useful in the present invention may differ considerably in method of preparation and starting materials. However common to all of these resins is the presence of a plurality of recurring groups having the structure:

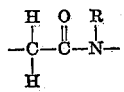

separated by alkylene groups containing at least 2 carbon atoms, and where R is hydrogen, a lower alkyl group having 1 to 4 carbon atoms, or an alkoxy group having 1 to 4 carbon atoms and having an intrinsic viscosity of at least 0.4. Intrinsic viscosity is defined in U. S. Patent 2,130,948 to W. H. Carothers. Polyamides in which R is hydrogen are preferred.

Among the polyamides which are useful in the present invention are polypentamethylene sebacamide, polyhexamethylene adipamide, polyhexamethylene sebacamide, polydecamethylene adipamide, polydecamethylene sebacamide, poly-m-phenylene sebacamide, 6-amino-caproic acid polymers, 7-amino-heptanoic acid polymers, 11-amino-undecanoic acid polymers, 12-amino-stearic acid polymers, as well as other polyamides and interpolyamides of the type mentioned in U.S. Patents 2,071,253, 2,130,523 and 2,130,948, issued to W. H. Carothers, and U.S. Patent 2,285,009, issued to M. M. Brubaker et al.

The epoxy resin adhesion promotors for the polyamides belong to a class of complex, polymeric epoxy-hydroxy ethers resulting from the catalyzed reaction of a polyhydric alcohol, e.g. glycols, glycerine, trimethylol propane, polyhydric phenols, polyphenols, with an excess of an epoxide, e.g. epihalohydrins, alkylene oxides, as described in U. S. Patents 2,456,408 and 2,592,560, issued to S. O. Greenlee. The principal product of this reaction is a resinous epoxy glyceryl polyether comprising epoxy glyceryl radicals, hydroxyl or chloride substituted glyceryl radicals, and the divalent residue of the polyhydric alcohol all united in a chain through ether oxygen atoms. From this class of polymeric epoxy-hydroxy ethers only those that ar liquid or at least flowable at room temperature, i.e. about 65° F., have an epoxide equivalent, i.e. number of grams of resin containing one gram-equivalent of epoxide, of about from 140 to 375 and have an average molecular weight of about from 290 to 750 are operable.

The polymeric epoxy-hydroxy ethers preferred in the instant invention may be represented by the following structural formulas:

*Polyether A*

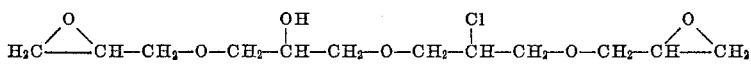

which is the reaction product of glycerine and an epoxide such as epichlorohydrin and has an epoxide equivalent of from 140 to 165; and

*Polyether B*

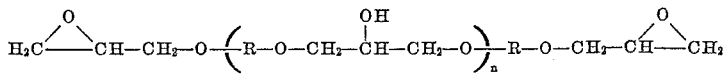

where $n$ is zero or a positive number (whole or fractional) less than 2 and R is the hydrocarbon radical of p,p'-dihydroxy-diphenyl-dimethyl methane (bisphenol-A). Polyether B is the reaction product of bisphenol-A and an epoxide such as epichlorohydrin and has an epoxide equivalent of about from 175 to 375 and an average molecular weight of about from 380 to 750.

It is believed that the outstanding adhesive properties of the polyamide-epoxy resin combination are due to a reaction between epoxide groups and reactive hydrogen atoms, primarily N-hydrogen atoms in the polyamide. This reaction takes place while the polyamide is in a molten state. However, prior to this reaction, the resin and promoter are brought together in a more or less physical combination. This physical combination may be accomplished in any suitable manner, for example: by treating a solid form of the polyamide, e.g. film, filament or rod, with a liquid promoter or a solution thereof in a volatile solvent; or a film of epoxy resin may be deposited on the surface that is to be bonded and the polyamide thereafter applied to the thus coated surface. Of these methods, the one whereby a solid form of the polyamide is treated with a solution of epoxy resin promoter is preferred.

The following examples are by way of illustration only and are not to be considered as limitations upon the scope of the invention.

EXAMPLE I

A pre-formed film of plasticized 11-amino-undecanoic acid condensation polymer described in U.S. Patent 2,071,253, about 3 to 6 mils, i.e. .003 to .006 inch, thick was immersed in about a 10% solution of the Polyether A in butanol-toluene and removed immediately. After removal from the solution, the excess solution was allowed to drain off and any residual solvent was evaporated by drying the coated tape at a moderately elevated temperature to produce an easily handled film.

A layer of the coated film of appropriate size was placed over each of two sheets of black iron, i.e. plain, sheet steel, heated to about 500° F. and held at this temperature for about 10 seconds after the film melted. The two sheets were then pressed together, cement sides facing each other, and held for an additional 15 seconds at the 500° F. temperature while maintaining a cement thickness of two or three mils between the metal sheets. The laminated sheets were then rapidly chilled to set the cement.

The polyamide of this example contains, as plasticizers, benzomonobutylamide and a mixture of o- and p-toluene ethyl sulfonamides. Either or both of these plasticizers may be omitted or other well known plasticizers may be substituted therefor.

EXAMPLE II

The method set forth in Example I was followed except that a 30% solution of a Polyether B having an epoxide equivalent of 185 to 200 was substituted for 10% solution of the Polyether A and the holding time for the assembled sheets was 30 seconds.

EXAMPLE III

The plasticized 11-amino-undecanoic acid polymer of Example I was immersed in a 20% solution of a Polyether B having an epoxide equivalent of 190 to 210 in butanol-toluene and immediately removed. The film was then allowed to drain and dried for subsequent use.

To each of two black iron sheets, a layer of the treated film was applied. Each sheet with its resin layer was heated to 470° F. and held at this temperature for 15 seconds to permit the resin layer to melt and wet the metal surface. The two sheets were then pressed together with the resin adhesive disposed in between and the assembly was held in this position for another 60 seconds and at a temperature of 425° F. maintaining a glue line thickness of 2 to 3 mils. Thereafter the assembly was chilled to set the cement.

EXAMPLE IV

The method set forth in Example I was repeated except that a 30% solution of a Polyether B having an epoxide equivalent of 190 to 210 in butanol-toluene was substituted for the 10% solution of the Polyether A and a holding time of 30 seconds was used after bringing together the metal sheets carrying the molten adhesive.

EXAMPLE V

The steps of Example I were repeated substituting an interpolyamide formed by the interpolymerization of (by weight) 40% hexamethylenediammonium adipate, 15% hexamethylenediammonium salts of oleic acid oxidation acids and 45% 6-amino-caproic acid as described in U.S. Patent 2,285,009, for the 11-amino-undecanoic acid polymer and a 30% solution of the Polyether A for the 10% solution. Also the holding time after joining the molten adhesive carrying surfaces was 60 seconds.

EXAMPLE VI

Example V was repeated using a polyamide formed by polymerizing chemically equivalent amounts of pentamethylene diamine and ethyl sebacate as described in U.S. Patent 2,130,523, in place of the interpolyamide of Example V and a holding time for the assembled sheets of 30 seconds.

The same procedure set forth in Example I, except for some variation in the time-temperature cycle, was successfully employed to bond metals having surfaces of nickel, zinc, tin, brass, aluminum, copper, various organic coatings, e.g. phenolic, oleoresinous, and inorganic coatings, e.g. metal chromate. With the chromate and phenolic coatings, a Polyether B having an epoxide equivalent of from 225 to 290 was used in place of the Polyether A and with the nickel surface a Polyether B having an epoxide equivalent of from 300 to 375 was employed. However, it is to be understood that the epoxy resin adhesion promoters may be used interchangeably with any surface and with any of the polyamides defined hereinbefore.

The amount of epoxy resin promoter needed to combine with the polyamide for the purpose of the instant invention is relatively small compared to the amount of polyamide. Weight ratios in the range of from about 0.025 to 0.30 part of promoter per part of polyamides are operable. If the polyamide is in the form of a solid article, film, rod, etc., an amount of promoter is used equal to about from 2.0 to 12.0 mgs. of promoter per square inch of polyamide.

The following table compares the peel strength, i.e. the force required to separate two sheets bonded together by pulling an edge of one sheet in one direction and the opposed edge of the other sheet in an opposite direction over Canco roll guides at a speed of one inch per minute, of various materials bonded with an epoxy resin treated polyamide of the present invention to the peel strength of the same material bonded by the same method but in which the linear polyamide is free from any epoxy resin adhesion promoter. By comparison, the peel strength of a 30% tin-70% lead solder bond is 55 lbs. per .75 in.

heptanoic acid, a polymer of 11-amino-undecanoic, a polymer of 12-amino-stearic acid, and interpolymers thereof, said adhesion promoter being a resinous epoxy glyceryl polyether having terminal epoxy glyceryl radicals united with the divalent residue of a polyhydric alcohol through ether oxygen atoms and having an epoxide equivalent of about from 140 to 375.

2. The adhesive of claim 1 in which the polyamide is an 11-amino-undecanoic acid polymer.

| Surfaces Bonded | Promoter | Polyamide described in Example— | Peel Strength in lbs. per .75 in. | |
|---|---|---|---|---|
| | | | Untreated | Treated |
| black iron | Polyether A | I | 18 | 101 |
| tin plate | do | I | 12 | 87 |
| zinc plate | do | I | 18 | 68 |
| aluminum | do | I | 9 | 61 |
| copper | do | I | 4 | 43 |
| brass | do | I | 9 | 42 |
| nickel plate | Polyether B-epoxide equivalent of from 300-375. | I | 15 | 77 |
| chromatized steel | Polyether B-epoxide equivalent from 225 to 290. | I | 12 | 49 |
| phenolic on metal | do | I | 16 | 79 |
| oleoresin on metal | Polyether A | I | 10 | 56 |
| black iron | do | V | 30 | 91 |
| Do | do | VI | 15 | 97 |
| glass [1] | do | I | 1,451 p.s.i. | 3,315 p.s.i. |
| wood [1] | do | I | 800 p.s.i. | 2,117 p.s.i. |

[1] Laps tested in shear instead of peel.

It is thought that the invention and many of its attendant advantages will be understood from the foregoing description, and it will be apparent that various changes may be made without departing from the spirit and scope of the invention or sacrificing all of its material advantages, the form hereinbefore described being merely a preferred embodiment thereof.

I claim:

1. A laminating adhesive consisting essentially of a preformed solid synthetic resin having a substantially uniform cross section and extensive surface area relative to said cross section, and from about 2.0 to 12.0 milligrams of an adhesion promoter per square inch of said synthetic resin surface in contact with said surface, said synthetic resin being a linear polyamide having an intrinsic viscosity of at least 0.4 and being selected from the group consisting of a polymer of pentamethylenediammonium sebacate, a polymer of hexamethylenediammonium adipate, a polymer of hexamethylenediammonium sebacate, a polymer of decamethylenediammonium adipate, a polymer of decamethylenediammonium sebacate, a polymer of m-phenylenediammonium sebacate, a polymer of 6-amino-caproic acid, a polymer of 7-amino- 3. The laminating adhesive set forth in claim 1 in which said polyhydric alcohol is selected from the group consisting of a glycol, glycerine, a polyhydroxy alkane having 4 to 6 carbon atoms, a polyhydric phenol and a polyphenol.

4. The adhesive of claim 3 in which the polyhydric alcohol is a glycerine.

5. The adhesive of claim 3 in which the polyhydric alcohol is a polyphenol.

6. The laminating adhesive set forth in claim 1 wherein said synthetic resin is coated with said adhesion promoter.

References Cited in the file of this patent

UNITED STATES PATENTS

| 2,607,709 | Simpson et al. | Aug. 19, 1952 |
| 2,637,716 | Ott | May 5, 1953 |
| 2,705,223 | Renfrew et al. | Mar. 29, 1955 |
| 2,760,944 | Greenlee | Aug. 28, 1956 |

OTHER REFERENCES

Charlton: "Alloying With Epoxies," Modern Plastics, volume 32, No. 1, September 1954, page 157.